United States Patent [19]

Quinn et al.

[11] 4,294,953

[45] Oct. 13, 1981

[54] PROCESS FOR PREPARING A BRANCHED POLYCARBONATE

[75] Inventors: Clayton B. Quinn; William Hilakos, both of Mt. Vernon, Ind.

[73] Assignee: General Electric Company, Mt. Vernon, Ind.

[21] Appl. No.: 44,040

[22] Filed: May 31, 1979

[51] Int. Cl.³ .............................................. C08G 63/62
[52] U.S. Cl. .................................... 528/128; 528/125; 528/126; 528/173; 528/176; 528/179; 528/180; 528/181; 528/182; 528/190; 528/191; 528/193; 528/194; 528/195
[58] Field of Search ............... 528/125, 126, 128, 173, 528/176, 179, 180, 181, 182, 190, 191, 193, 194, 195

[56] References Cited

U.S. PATENT DOCUMENTS

| | | | |
|---|---|---|---|
| 3,816,373 | 6/1974 | Hoogeboom | 528/176 |
| 4,001,184 | 1/1977 | Scott | 528/176 |
| 4,130,548 | 12/1978 | Kochanowski | 528/176 |
| 4,238,597 | 12/1980 | Markezich et al. | 528/173 X |

*Primary Examiner*—Howard E. Schain
*Attorney, Agent, or Firm*—Martin B. Barancik; William F. Mufatti

[57] ABSTRACT

A process for preparing a thermoplastic, randomly branched aromatic polycarbonate is disclosed which comprises reacting a carbonate precursor, a dihydric phenol, and a dianhydride branching agent and maintaining the resultant reaction medium at a pH of from about 9 to about 12 to thereby produce a thermoplastic randomly branched aromatic polycarbonate.

7 Claims, No Drawings

PROCESS FOR PREPARING A BRANCHED POLYCARBONATE

This invention relates to a process for preparing a thermoplastic randomly branched polycarbonate which is substantially free of cross-linking and which has excellent blow molding properties.

BACKGROUND OF THE INVENTION

Polycarbonates are well known, commercially important materials which are produced in large quantities. Such polymers are typically prepared by reacting a carbonate precursor with a dihydric phenol to provide a linear polymer consisting of units of the dihydric phenol linked to one another through carbonate linkages. These polycarbonates have outstanding mechanical, thermal and optical clarity (transparency), thermal and dimensional stability and impact strength. However, such polycarbonates typically differ from most thermoplastic polymers in their melt rheology behavior. Most thermoplastic polymers exhibit non-Newtonian flow characteristics over essentially all melt processing conditions. However, in contrast to most thermoplastic polymers, polycarbonates prepared from dihydric phenols typically exhibit Newtonian flow at normal processing temperatures.

Two other characteristics of molten thermoplastic polymers are considered to be significant for molding operations: melt elasticity and melt strength. Melt elasticity is the recovery of the elastic energy stored within the melt from distortion or orientation of the molecules by shearing stresses. Melt strength may be simply described as the tenacity of a molten strand and indicates the ability of the melt to support a stress. Both of these characteristics are important in extrusion blow molding, particularly in fabrication by extrusion blow molding. Non-Newtonian flow characteristics tend to impart melt elasticity and melt strength to polymers thus allowing their use in blow molding fabrication. In the usual blow molding operation, a tube of molten thermoplastic is extruded vertically downward into a mold, followed by the introduction of a gas, such as air, into the tube thus forcing the molten plastic to conform to the shape of the mold. The length of the tube and the quantity of material forming the tube are limiting factors in determining the size and wall thickness of the objects that can be molded by this process. The fluidity of the melt obtained from bisphenol-A polycarbonate, or the lack of melt strength as well as the paucity of extrudate swelling, serve to limit blow molding applications to relatively small, thin-walled parts. Consequently, the Newtonian behavior of polycarbonate resin melts severely restricts their use in the production of large hollow bodies by convention extrusion blowmolding operations as well as the production of various other shapes by profile extrusion methods.

Thermoplastic, randomly branched polycarbonates exhibit properties of non-Newtonian flow, melt elasticity and melt strength which permit them to obtain such articles as bottles which were not heretofore easily or readily produced with linear polycarbonates.

U.S. Pat. No. 4,001,184, issued Jan. 4, 1977, discloses preparing thermoplastic, randomly branched polycarbonates by reacting a dihydric phenol, a carbonate precursor and a polyfunctional aromatic compound which contains at least three functional groups selected from the group consisting of carboxyl, carboxylic anhydride and haloformyl, or mixtures thereof.

In this process, at least 20 to 100 weight percent of the stoichiometrically required amount of the carbonate precursor must be added to the reaction medium while said medium is maintained at a pH of about 3 to about 6. The pH of the mixture is thereafter raised to at least about 9 but less than about 12, at which time the remaining portion, if any, of the carbonate precursor is added to the reaction medium. While this process produces branched polycarbonate resins of high quality, the additional production steps and process monitoring necessitated by the pH processing profile of the reaction medium are disadvantageous for large scale commercial operations.

DESCRIPTION OF THE INVENTION

It has been discovered that high quality, thermoplastic, randomly branched aromatic polycarbonates which are substantially free of cross-linking and which exhibit excellent blow molding properties can be produced by the improved, surprisingly simple process of this invention which employs dianhydride compounds as branching agents. An important, advantageous feature of the invention's process is that when dianhydride compounds are used as branching agents, a highly efficient, one-step process results wherein the reaction medium can be maintained, throughout the course of the reaction, at a single pH level. This process is, therefore, economical and practical for large scale commercial operations since process conditions are simplified and operator involvement is reduced to a minimum.

In general, the invention's process comprises reacting a carbonate precursor, a dihydric phenol and a dianhydride branching agent while maintaining the resulting reaction medium at a single pH range of about 9 to about 12 to thereby produce a thermoplastic, randomly branched aromatic polycarbonate. The carbonate precursor, dihydric phenol, and dianhydride branching agent are preferably mixed in an aqueous medium which contains a solvent for the resultant polycarbonate, a catalytic amount of a polymerization catalyst and a molecular weight regulator.

The carbonate precursor is employed in at least a stoichiometric amount based on the dihydric phenol; i.e., there will be employed at least one mole of carbonate precursor per mole of dihydric phenol. However, it should be understood that the amount of carbonate precursor can also be in excess of the stoichiometric requirements without deleteriously effecting the process or the branched polycarbonate produced therefrom.

The carbonate precursor employed can be either a carbonyl halide, a haloformate, or a diaryl carbonate. Thus, the carbonyl halides can be carbonyl bromide, carbonyl chloride and mixtures thereof. The haloformates suitable for use include mono- or bis-haloformates of dihydric phenols (bischloroformates of hydroquinone, monochloroformate of bisphenol-A, etc.) or bishaloformates of glycols (bishaloformates of ethylene glycol, neopentyl glycol, polyethylene glycol, etc.). While other carbonate precursors will occur to those skilled in the art, carbonyl chloride, also known as phosgene, is preferred.

The amount of dianhydride branching agent which is reacted with the dihydric phenol and the carbonate precursor is critical to the extent that the amount employed must be sufficient to provide a true thermoplastic, randomly branched polycarbonate which is sufficiently free of cross-linking. If the amount of branching agent employed is less than about 0.05 mole percent, based upon the moles of dihydric phenol employed, the resulting polymer will not exhibit the degree of non-Newtonian melt characteristics desired for blow molding and/or melt extrusion. Preferably, it is desirable to employ about 0.2 to about 0.45 mole percent of the dianhydride compound based upon the total moles of dihydric phenol.

Dianhydride branching agents that can be employed in the practice of this invention include aromatic dianhydrides such as benzophenone tetracarboxylic and dianhydride, pyromellitic acid dianhydride, 4,4'-[2,2-bis(4-hydroxyphenyl)propane]-dianhydride, 1,4,5,8-naphthalene tetracarboxylic dianhydride and the like; aliphatic dianhydrides such as meso-1,2,3,4-tetracarboxybutane dianhydride, 1,2,3,4-tetracarboxy cyclopentane dianhydride, 1,2,3,4-tetracarboxy-tetrahydrofuran dianhydride, and bicyclo (2.2.2) oct-7-ene-2,3,5,6-tetracarboxylic acid dianhydride, and the like; their haloformyl derivatives, or mixtures thereof. The term "dianhydride branching agent" as used in the specification and claims refers to both the dianhydride compounds broadly set forth above and their haloformyl derivatives.

The dihydric phenols that can be employed in the practice of this invention include bis(4-hydroxyphenyl)methane, 1,1-bis(4-hydroxyphenyl)ethane, 2,2-bis(4-hydroxyphenyl)propane, also called bisphenol-A or BPA, 2,2-bis(4-hydroxy-3-methylphenyl)propane, 3,3-bis(4-hydroxyphenyl)pentane, 2,2-bis(4-hydroxyl-3-chlorophenyl) propane, 2,2-bis(4-hydroxy-3,5-dibromophenyl)propane, 1,1-bis(4-hydroxyphenyl)cyclohexane, p,p'-dihydroxydiphenyl, 3,3-dichloro-4,4'-dihydroxydiphenyl, bis(4-hydroxyphenyl)ether, bis(4-hydroxyphenyl)sulfone, bis(3,5-dimethyl-4-hydroxyphenyl)sulfone, resorcinol, hydroquinone; 1,4-dihydroxy-2,5-dichlorobenzene, 1,4-dihydroxy-3-methylbenzene, bis(4-hydroxyphenyl)sulfoxide, bis(3,5-dimethyl-4-hydroxyphenyl)sulfoxide, etc. Additional dihydric phenols can also be employed such as are disclosed in U.S. Pat. Nos. 2,999,835; 3,028,365, 3,153,008, and 4,001,184. It is, of course, possible to employ two or more different dihydric phenols or a copolymer of a dihydric phenol with glycol or with hydroxy or acid terminated polyester, or with a dibasic acid in the event a polycarbonate copolymer or interpolymer (co-polyester-carbonate), rather than a homopolymer, is desired for use in the preparation of the desired aromatic branched polycarbonates. The preferred dihydric phenol is bisphenol-A (BPA).

The catalysts which are employed can be any of the suitable catalysts that aid the polymerization of dihydric phenols with phosgene. Suitable catalysts include tertiary amines such as triethylamine, tripropylamine, N,N-dimethylaniline; quaternary ammonium compounds such as tetraethylammonium chloride, cetyl triethyl ammonium bromide, tetra-n-heptylammonium iodine, tetra-n-propyl ammonium chloride, tetramethyl-ammonium chloride, tetramethyl ammonium hydroxide, tetra-n-butylammonium iodide, benzyltrimethylammonium chloride; and quanternary phosphonium compounds such as for example, n-butyltriphenyl phosphonium bromide and methyltriphenyl phosphonium bromide.

The catalyst is preferably employed in an amount of from about 1 to about 3 mole percent and most preferably from about 1.2 to about 2 mole percent, based on the moles of dihydric phenol.

The molecular weight regulators which can be employed include monohydric phenols such as phenol, 4-(2,4,4-trimethylchromanyl) phenol, also known as chroman-I, paratertiary-butylphenol, p-cumyl phenol, primary and secondary amines, etc. Preferably, phenol is employed as the molecular weight regulator.

An important aspect of the instant invention is that the pH of the reaction medium is maintained at a single level of about 9 to about 12 during the entire course of the reaction. The pH level can be controlled by metering into the reaction medium a sufficient amount of a basic solution, such as an aqueous alkali metal hydroxide solution.

In the practice of the invention there can be also optionally introduced into the reaction medium reducing or chelating agents such as sodium gluconate, sodium dithionite, sodium borohydride, sodium sulfite, sodium thiosulfate, hydrazine hydrate, hydrazine hydrochloride and the like. Such agents serve to suppress the formation of colored contaminants.

The temperature of the reaction medium can generally be maintained from ambient to about 50° C., although higher temperatures can also be used since temperature is not a critical parameter in the instant process.

The reaction of the carbonate precursor, the dihydric phenol and the polyfunctional aromatic compound in accordance with this invention is conducted in an inert organic solvent which does not enter into the polymerization reaction, is essentially immiscible with water and does not deleteriously affect the formed polymer. Examples of suitable organic solvents which can be employed are methylene chloride, ethylene dichloride and chlorobenzene. Other suitable polycarbonate resin solvents will readily occur to those skilled in the art.

The branched polycarbonates produced according to the invention can be readily recovered by conventional methods known to those skilled in the art, such as steam precipitation.

These branched polycarbonates are soluble in selected organic solvents and can be worked into shaped articles from solutions, such as into films. Being thermoplastic, these branched polycarbonates can be easily fabricated by convention shaping methods from melt, such as by extrusion, molding, blow-molding, lamination, and the like. These branched polycarbonates can be in composition with other ingredients, such as fillers, glass fibers, and the like, that are standardly employed in thermoplastic polymer compositions.

EXAMPLES

The examples which follow are intended to illustrate the invention but not limit it. Unless otherwise specified, the mole percents for each of the various reaction components are in reference to the total moles of the dihydric phenol employed. In all of the examples the reactants were initially mixed at room temperature and no external heat was applied.

For those tests that require molded specimens, the branched polycarbonates were fed into an extruder operating at about 265° C. and the extrudates were comminuted into pellets. The pellets were then injection molded at about 315° C. into test samples. Intrinsic viscosity (I.V.) of the product polycarbonates was determined in methylene chloride solution at 25° C. Modified melt flow (K.I.) values, expressed in centiseconds, were obtained by an automated ASTM D-1238 procedure at 300° C. on a Tinius Olsen Melt Indexer, Model T-3, Condition 0. Melt index ratio (M.I.R.), which is the ratio of melt flow rates at two different shear levels and is a measure of the non-Newtonian property of the polymer, was obtained on the Tinius Olsen Melt Indexer described above. The M.I.R. values of linear Newtonian polycarbonates are typically less than about 1.4, while those of the non-Newtonian branched polycarbonates are typically higher than about 2.

EXAMPLE 1

A reaction vessel was charged with 114 g of bisphenol-A (0.50 mole), 1.64 g of phenol (3.5 mole % based on the BPA), 350 ml of methylene chloride, 275 ml of water, 1.25 ml of triethylamine, and 0.396 g of butane tetracarboxylic acid dianhydride (0.4 mole % based on the BPA). A total of 57 g of phosgene was delivered to the reaction at a rate of 2.0 g/min for 28.5 minutes while the pH of the reaction mixture was maintained between 10.0 and 11.5 with 35% aqueous caustic. The reaction mixture was diluted with an additional 300 ml of methylene chloride. The brine was separated and the organic phase was washed once with 0.1 N HCl and three times with water. The branched polycarbonate product was isolated by precipitating the methylene choride/polycarbonate solution into methanol using a 10 to 1 volume ratio of methanol to methylene chloride-polymer solution. The white polycarbonate was collected by filtration and dried in a vacuum oven at 120° C. for 2 days. The polycarbonate product had an I.V. of 0.67 dl/g and an M.I.R. of 2.3.

EXAMPLE 2

A reaction vessel was charged with 2280 g (10 moles) of bisphenol-A, 32 g (3.5 mole %) phenol, 14 ml (1 mole %) triethylamine, 3.4 g sodium glyconate, 6.8 g (0.03 mole %) of pyromellitic dianhydride, 7 liters methylene chloride and 5.5. liters water. The resulting mixture was well stirred. To this mixture was added a total of 1080 g of phosgene at a rate of 36 g/min for 30 minutes. During the addition of the phosgene, the pH of the reaction mixture was maintained at from about 11 to about 11.5 by the addition of an aqueous solution (about 50% by weight) of sodium hydroxide. Completion of the reaction of phosgene with bisphenol-A was determined by phosgene blow-by and disappearance of the free monomer.

The resulting polycarbonate in methylene chloride solution was separated from the aqueous phase, washed once with aqueous HCl, twice with water and recovered by steam precipitation.

The white polycarbonate recovered had an I.V. of 0.62 gl/g.

EXAMPLE 3

A reaction vessel was charged with 2265 g (9.9 moles) of bisphenol-A, 7 liters methylene chloride, 5.5. liters water, 32.9 g (3.5 mole %) phenol, 14 ml (1.0 mole %) triethylamine, 5.0 (0.25 mole %) tetracarboxybutane dianhydride and 3.4 g sodium gluconate. The resulting mixture was well stirred. To this mixture was added a total of 1080 g of phosgene at a rate of 36 g/min for 30 minutes. During the addition of phosgene, the pH of the reaction mixture was maintained between 10.5 and 12.0 by the addition of an aqueous solution (about 50% by weight) of sodium hydroxide. The reaction mixture was diluted with 7 liters of methylene chloride and phase separated to remove the brine solution produced during the reaction. The methylene chloride phase was washed once with HCl, three times with water and the desired polymer was recovered by steam precipitation as a white polycarbonate resin, with an I.V. of 0.58 dl/g, K.I. of 16,740 and M.I.R. of 2.33.

EXAMPLES 4 to 12

In each of Examples 4 to 12 the procedure of Example 3 was followed except that at least one of the following reaction conditions was varied: the identity and/or amount of dianhydride utilized; the amount of phenol utilized; and/or the amount of triethylamine utilized. Table I sets forth the reaction variations employed as well as the I.V., K.I. and M.I.R. values for the polycarbonates produced by each of Examples 4 to 12. (PMDA=pyromellitic acid dianhydride; BPA-DA=4,4'-[2,2-bis(4-hydroxyphenyl)propane]-dianhydride; BTDA=benzophenone tetracarboxylic acid dianhydride; TCDA=1,2,3,4-tetracarboxybutane dianhydride; TEA=triethylamine.)

TABLE I

| Example | Dianhydride | Mole % Dianhydride | Mole % Phenol | TEA Mole % | K.I. | I.V. | M.I.R. |
| --- | --- | --- | --- | --- | --- | --- | --- |
| 4 | PMDA | 0.4 | 3.5 | 1.0 | 35,060 | .620 | 2.5 |
| 5 | PMDA | 0.3 | 3.5 | 1.8 | 14,650 | .627 | 2.2 |
| 6 | BPA-DA | 0.3 | 3.5 | 1.0 | 19,630 | .610 | 2.51 |
| 7 | BPA-DA | 0.3 | 3.5 | 1.0 | 14,280 | .499 | 2.12 |
| 8 | BTDA | 0.45 | 3.5 | 1.8 | 17,350 | .582 | 2.31 |
| 9 | TCDA | 0.45 | 3.5 | 1.0 | 12,630 | .560 | 2.2 |
| 10 | TCDA | 0.4 | 3.5 | 1.8 | 26,840 | .629 | 2.72 |
| 11 | TCDA | 0.3 | 3.0 | 1.0 | 27,150 | .624 | 2.6 |
| 12 | TCDA | 0.3 | 3.0 | 1.5 | 17,950 | .582 | 2.38 |

What is claimed is:

1. A process for producing a thermoplastic, randomly branched polycarbonate substantially free of cross-linking which consists essentially of reacting, at a pH of about 9 to 12, a carbonate precursor, a dihydric phenol, and a dianhydride branching agent, to thereby produce a thermoplastic randomly branched polycarbonate.

2. The process of claim 1 wherein the dianhydride branching agent is selected from the group consisting of 1,2,3,4-tetracarboxybutane dianhydride, benzophenone tetracarboxylic acid dianhydride, 4,4'-[2,2-bis(4-hydroxyphenyl)propane]-dianhydride, and pyromellitic dianhydride or mixtures thereof.

3. The process of claim 1 wherein the dianhydride is employed in an amount of at least 0.05 mole percent, based on the total moles of dihydric phenol.

4. A process for producing a thermoplastic, randomly branched polycarbonate which comprises reacting, at a pH of about 9 to 12, a carbonate precursor, a dihydric phenol and at least 0.05 mole percent, based upon the total moles of dihydric phenol, of a dianhydride branching agent selected from the group consisting of 1,2,3,4-tetracarboxybutane dianhydride, benzophenone tetracarboxylic acid dianhydride, 4,4'-[2,2-bis(4-hydroxyphenyl)propane]-dianhydride, and pyromellitic dianhydride or mixtures thereof.

5. The process of claim 4 wherein the dihydric phenol is bisphenol-A.

6. The process of claim 4 wherein the carbonate precursor is phosgene.

7. The process of claim 4 wherein the dianhydride is employed in an amount of from about 0.2 mole percent to about 0.45 mole percent, based on the moles of dihydric phenol.

* * * * *